United States Patent Office 3,022,312
Patented Feb. 20, 1962

3,022,312
METHOD OF PREPARING STEROID DERIVATIVES
Bernard S. Wildi, Dayton, Ohio, assignor to Monsanto Chemical Company, St. Louis, Mo., a corporation of Delaware
No Drawing. Filed Mar. 19, 1956, Ser. No. 572,237
4 Claims. (Cl. 260—289)

This invention is directed to the preparation of enol lactams of steroids from the keto acids or keto acid esters of steroids. The keto acids of steroids are α,γ-seco-β-nor-γ-keto-steroid-α-oic acids which can be formed by cleaving a ring of a steroid nucleus with an oxidizing agent. The present invention involves heating a keto acid or keto acid ester of a steroid with a source of ammonia or a primary amine to convert the keto acid or keto acid ester to an enol lactam of the steroid, i.e., to an α-keto-β-aza-γ-unsaturated steroid derivative.

The reaction of the present invention can be represented by the following reaction with the keto acid of progesterone:

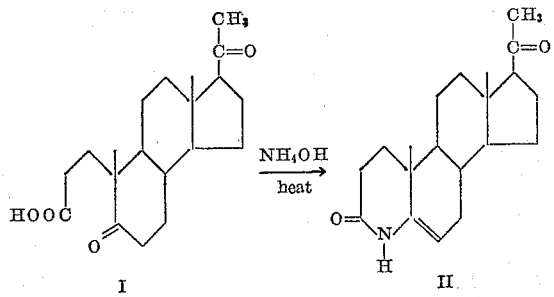

The keto acid (I) was formed by oxidation of progesterone:

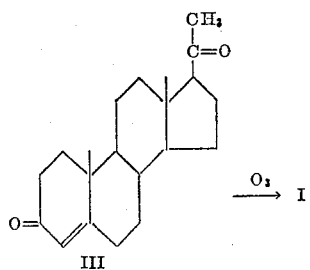

The nitrogen atom in the enol lactam (II) occupies the position originally occupied by the double-bonded carbon atom adjacent to the carbonyl carbon atom, i.e., the β-position by the designations used above. The β-carbon atom will similarly be replaced by nitrogen in other steriods.

The enol lactams of steroids are new compounds which are disclosed and claimed in my copending application Serial No. 572,235, now Patent No. 2,897,202, filed of even date herewith. The novel enol lactams have valuable uses for therapeutic purposes. For example, some of my new enol lactams exhibit anti-inflammatory activity in tests which are related to activity against rheumatoid arthritis; for example Δ⁵-4-azapregnen-3,20-dione exhibits marked activity in these tests, and Δ⁵-17α-acetoxy-4-azatesten-3-one approaches the activity of cortisone. My new enol lactams of steroids have further uses in the preparation of other valuable organic compounds for therapeutic and other purposes. The table below compares the anti-inflammatory activity of the enol 4-lactam of progesterone in the Winters' modification of the Selye inflammation test with rats with inflamed ankes, to the activity of cortisone in that test. The dosages were 50 mg./kc. subcutaneously.

TABLE I

| Compound | "t" | |
|---|---|---|
| | 24 hours | 48 hours |
| Enol lactam of progesterone | 7.45 | 6.65 |
| Cortisone acetate | 2.59 | 2.73 |

The values for "t" in Table I are statistical values showing differences between treated and non-treated animals. It can readily be seen that the enol lactam of progesterone has a marked effect, the effect being much greater than that of cortisone.

The source of ammonia for my procedure is preferably ammonia water, i.e., a solution of ammonia in water which is ammonium hydroxide.

My invention provides a convenient method for preparing the enol lactams of steroids via the keto acids of the steroids.

The keto acids of steroids are known compounds which are prepared by ozonolysis of steroids containing a conjugated carbonyl group. Other oxidizing agents, e.g., hypohalite solution, permanganates, etc. can be used to oxidize some steroids containing conjugated carbonyl unsaturation to the corresponding keto acids; for example sodium hypohalite solution oxidizes Δ⁴-cholesten-3-one to the keto acid.

The procedure of the present invention is generally applicable to the keto acids of steroids and their esters, i.e., to the α,γ-seco-β-nor-γ-keto-α-oic steroids. It will be understood of course that the nor- and homo- steroids are included in the group of steroids, e.g., the 18-nor and 19-nor steroids are included, and the steroid rings can be made larger or smaller as in A-nor, D-nor, D-homo, and D-bis-homo steroids. Moreover, the process is applicable to the cyclopentano-10,13-dimethylpolyhydrophenanthrenes regardless of the type of side chain on the 17-carbon atom. For example, the process can be applied to the keto acids and esters of the sapogenins, the sitosterols, the stigmasterols, the ergosterols, the sexual hormones, etc. In some cases it will be necessary to protect reactive groups in the side chain by known methods during the ozonization step to prepare the keto acid, but once the keto acid is prepared, the amination step can ordinarily be conducted without protecting such groups. The steroids can also contain other substituents, such as keto groups, hydroxyl groups, acyloxy groups, halo groups, unsaturated groups, etc. The step of heating with ammonium hydroxide will not ordinarily affect such groups except in a few cases, e.g., acid groups will react to give the amide or ammonium salt derivatives; however, even in these cases an enol lactam of a steroid is still produced.

Among the keto acids of steroids to which the process is applicable are steroids containing the functional groups in the following positions: 1,3-seco-3-keto-1-oic acids, 2,4-seco-2-keto-4-oic acids, 2,4-seco-4-keto-2-oic acids, 3,5-seco-5-keto-3-oic acids, 5,7-seco-5-keto-7-oic acids, 6,8-seco-8-keto-6-oic acids, 9,12-seco-9-keto-12-oic acids, 15,17-seco-15-keto-17-oic acids. Other keto acids which can be used in the reaction can be obtained if the rings are expanded; for example, a D-homo steroid has a D-ring which is similar to the A-ring so far as the production of keto acids is concerned. In the above designation of positions in the keto acids, it is understood that one of the carbon atoms has been eliminated from the ring, e.g., in 3,5-seco-, the 4-carbon has been eliminated; the elimination of this atom could be designated by 4-nor, but such designation appears unnecessary as it is apparent that the 4-carbon is eliminated.

Example 1

The keto acid of Δ⁴-cholesten-3-one, 3,5-seco-5-keto-cholestan-3-oic acid, 1 gram, was heated at 200° C. with 80 ml. of concentrated ammonium hydroxide in a bomb. The reaction mixture was cooled and filtered to yield 0.721 gram of the enol lactam of cholestenone, 4-aza-Δ⁵-cholesten-3-one, M.P. 248–250° C. The compound was recrystallized from ethyl alcohol to give 0.502 gram, M.P. 249–251° C. The product was identical to that prepared by heating the enol lactone of Δ⁴-cholesten-3-one with ammonium hydroxide, giving no depression in melting point.

The keto acid of Δ⁴-cholesten-3-one above was prepared by a known method, ozonolysis of cholestenone (Windaus, Ber. 39 2008 (1906)). The preparation is also reported in my copending application, Serial No. 572,235, filed of even date herewith.

Example 2

The keto acid of Δ⁴-cholesten-3-one, 8.0 grams was heated for 48 hours with 300 ml. of concentrated ammonium hydroxide. The reaction mixture was cooled and filtered to give 6.76 grams of M.P. 247–250° C. (with decomposition) for a yield of 89%. The enol lactam was recrystallized from ethyl alcohol to give 5.49 grams of M.P. 249–253° C.

Example 3

The methyl ester of the keto acid of Δ⁴-cholesten-3-one, 1 gram, was added to 90 ml. of concentrated ammonium hydroxide and heated in a bomb at 185° C. for 18 hours. The reaction mixture was cooled and filtered and the product was recrystallized from ethyl alcohol to give 0.55 gram of the enol lactam having a melting point of 249–252° C. (with decomposition).

The methyl ester of the keto acid above was prepared by treating a 6-gram solution of the keto acid in 100 ml. of ethyl ether with a 20-fold excess of diazomethane in 250 ml. of ether and letting the solution stand at −5° C. for 1 hour and then at room temperature for three days.

Example 4

3,5-seco-5-keto-D-homo-Δ$^{9(11),16}$-androstadiene-3-oic acid, 1.5 grams, was heated with 90 ml. of concentrated ammonium hydroxide at 185° C. for 18 hours. The reaction mixture was cooled and filtered and the crystals that separated were recrystallized from ethyl alcohol after treatment with charcoal. The enol lactam, 4-aza-3-keto-D-homo-Δ$^{5,9(11),16}$-androstatriene, had a melting point of 239–44° C. (dec.).

The reaction was repeated to give 0.356 grams of the enol lactam of M.P. 242–245° C. (dec.). This product had the following analysis:

*Anal.*—Calc'd for $C_{19}H_{25}NO$: C, 80.52; H, 8.89; N, 4.95. Found: C, 80.32; H, 8.37; N, 5.19.

The compound has the structural formula:

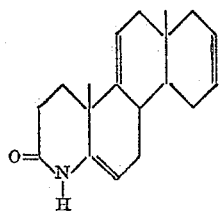

Example 5

Cortisone acetate, 5.0 grams, was dissolved in 700 ml. of dry ethyl acetate and cooled in a Dry Ice-methanol solution. Ozone was passed through the mixture for 45 minutes during which the solution became light blue in color. The ozonolysis was stopped and 7.5 ml. of 30% $H_2O_2$ was added to the solution followed by 7.5 ml. of methanol. The solution was crystallized to give 3,5-seco-17α-hydroxy-21-acetoxy-5,11,20-triketo-pregnane-3-oic acid of melting point 158–159° C. Upon heating one part by weight of the keto acid of cortisone in a bomb with 15 volumes of $NH_4OH$ at 185° C. for about 18 hours, the enol lactam of cortisone acetate is produced, i.e., 4-aza-17α-hydroxy-21-acetoxy-Δ⁵-pregnen-3,11,20-trione.

Example 6

Cortisone acetate, 5 grams was dissolved in 700 ml. of dry ethyl acetate, cooled in a Dry Ice-acetone bath, and saturated with a stream of oxygen containing ozone. After 40 minutes the solution was a deep blue. Methyl alcohol, 7.5 ml., and 7.5 ml. of 30% $H_2O_2$ was added, and the reaction mixture was allowed to stand for 18 hours. The reaction mixture was evaporated to dryness under vacuum by heating at 100° C. at 5 mm. Hg for 45 minutes. The material was recrystallized from acetone-petroleum ether (Skelly B) to yield 1 gram of M.P. 128–135° C.

The keto acid of cortisone acetate, 1 gram, was heated with 75 ml. of concentrated ammonium hydroxide at 150° C. for 6 hours in a glass lined bomb. The mixture was cooled and evaporated to dryness under vacuum. The residue was taken up in ethyl alcohol; upon evaporation, crystals formed. The residue was taken up in methyl alcohol, water was added, the solution was treated with charcoal, and then concentrated to about 4 ml. The solution was seeded and put in the refrigerator to give, after evaporation of solvent, a partially crystalline product which contained the enol lactam of cortisone acetate.

Example 7

Testosterone acetate was ozonized to the corresponding keto acid by passing ozone into a solution of 7.29 grams of the acetate in 400 ml. of ethyl acetate and 100 ml. of acetic acid, at a rate of 0.4 cu. ft./min. under 8 lbs. pressure and at a setting of 100 volts, for 45 minutes at −60° C. The solution was warmed to −30° C. and 400 ml. of acetic acid and 5 ml. of hydrogen peroxide in 40 ml. of water was added, and the solution was allowed to stand for 18 hours. The reaction mixture was worked up by alkali extraction, acidification, and ether extraction, and the product was recrystallized from ether-acetone to give the keto acid of testosterone acetate, M.P. 202–205° C.

The keto acid of testosterone acetate, 3 grams, was heated for 18 hours at 200° C. with 60 ml. of concentrated ammonium hydroxide. The reaction mixture was cooled and filtered and the product was recrystallized from ethyl alcohol to give the enol lactam of testosterone acetate, 17-β-acetoxy-4-aza-Δ⁵-testen-3-one, of M.P. 306–308° C. (dec.). This compound can be readily saponified to 17-β-hydroxy-4-aza-Δ⁵-testen-3-one.

Example 8

The procedure of Example 7 was carried out with 7-ketocholesterolacetate which can be obtained by oxidation of cholesterol acetate with chromic acid (Windaus et al., Ann 520, 98 (1935)). The ozonization procedure first converts the 7-keto cholesterol to 3-acetoxy-5,7-seco-5-keto-cholestane-7-oic acid, which is then converted to the enol lactam by heating with ammonium hydroxide, i.e., to 3-acetoxy-6-aza-Δ⁴-cholesten-7-one which can readily be saponified to the corresponding 3-hydroxy compound.

Example 9

The keto acid of cholestenone, 1 gram, and 70 ml. of N-butyl amine were heated at 200° C. for 18 hours. The reaction mixture was cooled and evaporated to produce the N-butyl enol lactam of cholestenone as a dark colored oil.

Other primary amines such as lower alkyl, or aralkyl amines can be used to prepare N-alkyl or N-aralkyl lactams. For example, the following primary amines can be used: methyl amine, ethyl amine, n-propyl amine, n-butyl amine, isopropyl amine, 2-methyl-3-amino-propane, n-pentyl amine, n-hexyl amine, 2-methyl-4-aminobutane, n-octyl amine, cyclohexyl amine, cyclohexylmethyl amine, ethanol amine, 1-aminohexene-5, (2-phenylethyl)-amine, (1-phenylethyl)-amine, etc. The aromatic primary amines, e.g., aniline, p-ethylaniline, naphthyl amines, etc. are less preferred because they are more difficult to react, but they can be used in the reaction.

While ammonium hydroxide is ordinarily the source of ammonia, it should be understood that ammonia gas could simply be passed over or through the steroid at the reaction temperature. While it is convenient to conduct the reaction under autogenous pressure in order to avoid the loss of volatile reactants, this is not considered essential to the process as the ammonia gas can be recycled and kept in contact with the steroid at lower pressures.

The reaction conditions for the formation of the enol lactam can vary considerably; for example temperatures of 100 to 250° C. can be used for 6 to 60 hours. Temperatures of 175 to 210° C. for 15 to 50 hours are ordinarily used. While a commercial concentrated ammonium hydroxide is ordinarily used for convenience, it is possible to use dilute ammonium hydroxide solutions, or more concentrated ammonium hydroxide, or ammonia itself. The primary amines can be used as such, or dissolved in solvents. Some water should be present if it is desired to avoid the conversion of keto groups to imide groups; the water liberated in the reaction is usually sufficient for this purpose.

While it is ordinarily more convenient to use the free keto acid of the steroid, the esters of the keto acid can also be used if they happen to be available. As the ester group does not form part of the product, the particular alcoholic ester radical is not important. Any of the lower aliphatic or aralkyl alcohols, or even the phenols can be used for the esterification, although for reasons of economy the lower alkyl alcohols, such as those with 1 to 8 carbon atoms, would be used, e.g., methyl alcohol, ethyl alcohol, propyl alcohol, isopropyl alcohol, allyl alcohol, butyl alcohol, sec-butyl alcohol, t-butyl alcohol, isobutyl alcohol, amyl alcohol, isoamyl alcohol, n-hexanol, cyclohexanol, n-octanol, etc. Phenol or benzyl alcohol can also be used.

Although the present process can be applied to substitute nitrogen atoms in any of the rings of the steroid, it is more readily applicable to substitution in the A-ring, because of the larger number of natural steroids which possess structures in the A-ring which can be cleaved to produce the keto-acids. Some preferred keto acids, and esters of the keto acids, can be represented by the following structural formula:

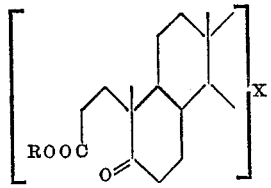

in which R is H or an alkyl, aralkyl, or aryl group and in which X is selected from

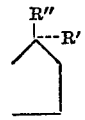

in which R' is —H, —OH, or

and R'' is —COOR,

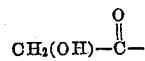

—H, —OH, RCOO—, —CH(CH$_3$)(CH$_2$)$_3$CH(CH$_3$)$_2$, or —CH(CH$_3$)CH=CH—CH(CH$_3$)—CH—(CH$_3$)$_2$, R having the same meaning as above; and

It will be understood, of course, that in the above structural formulae there can be other substituents or double bonds in the steroid nucleus.

The reaction of these keto acids produces enol lactams represented by the following structural formula:

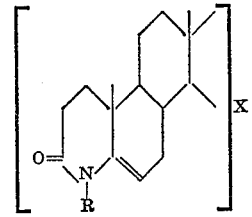

in which X has the same meaning as above and R is H, or an alkyl, aralkyl, or aryl group.

A few of the keto acids and keto acid esters other than those of the examples above which can be used in the present invention are 1,3-seco-3-keto-cholestan-1-oic acid, 1,3 - seco - 3,11,20 - keto - 17α - hydroxy - 21 - acetoxy-Δ$^5$ - pregnen - 1 - oic acid, 1,3 - seco - 3 -keto - 17β-hydroxy-testan-1-oic acid, the n-hexyl ester of 2,4-seco-2,20-keto-pregnan-4-oic acid, the dimethyl ester of 3,5-seco - 5 - keto - testan - 3 - oic - 17β - carboxylic acid, 5,7-seco-5,20-keto-pregnan-7-oic acid, the butyl ester of 5,7 - seco - 5,11 - keto - pregnan - 7 - oic acid, 9,12-seco - 3,9,20 - keto - 4,5 - dibromo - 17α,21 - diacetoxy-pregnan - 12 - oic acid, 15,17 - seco - 15 - keto - testan-17 - oic acid, 3,5 - seco - 5,20 - keto - 11 - acetoxy - Δ$^7$-pregnen - 3 - oic acid, 3,5 - seco - 5 - keto - Δ$^{9(11),22}$-ergostadien-3-oic acid, 5,7-seco-5,20-keto-19-nor-pregnan-7-oic acid, etc. These keto acids and their esters react to give the desired products, e.g., the 9,12-seco-compound above gives an enol 11-lactam which is easily debrominated to 3,12,20 - keto - 11 - aza - 17α,21 - diacetoxy-Δ$^{4,8(9)}$-pregnadiene, which can be readily saponified to the 17α,21-dihydroxy compound.

The ozonator used in the present examples was calibrated by running for 2 hours at 0.04 cu.ft./min., 100 volts, and 8 lbs. pressure. The ozone was collected in 400 ml. of 2% KI, which was then acidified and titrated with 0.1062 N Na$_2$S$_2$O$_3$, 154.8 ml. being required.

A convenient, simple method of preparing enol lactams of steroids from keto acids of steroids has been described. Methods of converting steroids to enol lactams of steroids by way of the keto acids have also been described.

I claim:

1. A method of preparing 3-keto-4-aza-Δ$^5$-cyclopentanopolyhydrophenanthrenes which comprises heating a 3,5-seco-5-keto-3-oic cyclopentano-10,13-dimethylpolyhydrophenanthrene with a compound selected from the group consisting of ammonia and R—NH$_2$ in which R is alkyl of 1 to 8 carbon atoms at temperatures of 100 to 250° C. to form the said 3-keto-4-aza-Δ$^5$-cyclopentanopolyhydrophenanthrene.

2. A method of preparing 3-keto-4-aza-Δ$^5$-cyclopentanopolyhydrophenanthrenes which comprises heating a 3,5-seco-5-keto-3-oic cyclopentano-10,13-dimethylpolyhydrophenanthrene with ammonia at temperatures of 100 to 250° C. to form the said 3-keto-4-aza-Δ$^5$-cyclopentanopolyhydrophenanthrene.

3. A method of preparing Δ$^5$-4-azapregnen-3,20-dione which comprises heating 3,5-seco-5,20-keto-pregnane-3-oic acid with ammonium hydroxide to temperatures of 100 to 250° C. to obtain $\Delta^5$-4-azapregnen-3,20-dione.

4. A method of preparing 3-keto-4-aza-$\Delta^5$-cyclopentano-10,13-dimethylpolyhydrophenanthrenes which comprises oxidizing a 3-keto-$\Delta^4$-cyclopentano-10,13-dimethylpolyhydrophenanthrene to the corresponding 3,5-seco-5-keto-3-oic acid, and heating said acid with ammonium hydroxide to temperatures of 175 to 210° C. for 15 to 50 hours in a closed system to prepare the said 3-keto-4-aza-$\Delta^5$ compound.

References Cited in the file of this patent

UNITED STATES PATENTS

| 2,227,876 | Bolt | Jan. 7, 1941 |
| 2,738,350 | Mazur | Mar. 13, 1956 |
| 2,760,975 | Knowler | Aug. 28, 1956 |

OTHER REFERENCES

Kaufmann: J. Am. Chem. Soc., vol. 73, April 1951, pages 1779–1780.